UNITED STATES PATENT OFFICE.

CHARLES H. O'ROURKE, OF NEW ORLEANS, LOUISIANA.

PROCESS FOR SEPARATING PITH FROM FIBER FROM BAGASSE.

1,260,437.   Specification of Letters Patent.   Patented Mar. 26, 1918.

No Drawing.   Application filed May 10, 1917.   Serial No. 167,760.

*To all whom it may concern:*

Be it known that I, CHARLES H. O'ROURKE, a citizen of the United States, residing at New Orleans, in the parish of Orleans and State of Louisiana, have invented certain new and useful Improvements in Processes for Separating Pith from Fiber from Bagasse, of which the following is a specification.

Sugar cane from which bagasse is derived is a member of the large family of grasses—*Graminaceæ*—of the tribe *Andropogon*, and its botanical name is *Saccharum officinarum*, or *Arundo saccharifera*. Its height varies according to the soil and climatic conditions governing its growth ranging to fifteen feet or more. The stalk is divided into joints or nodes. These joints mature and cast their leaves, until finally a naked stalk with only a few leaves at its upper extremity remain. An average sample of Martinique cane at maturity, contains: water 71.04%, sucrose 18.02%, fiber 9.56%, nitrogenous matter 0.55%, resinous, fatty and coloring matter 0.35% and ash 0.48%. In other words its average content is juice 90.44%, fiber 9.56%.

Bagasse is the name applied in the United States (in some sections of the world the term "megasse" is used) for the residue of sugar cane after the juice has been extracted. Bagasse has been used for fuel and for cattle and stock feed and has been successfully dried for these purposes years ago. Attempts have been made to use the fiber of bagasse for fabrication without economical success. This has been due to failure to properly treat the bagasse. An average ton of Louisiana bagasse reduced to a dried state contains approximately: water 7.72%, nitrogen 0.36%, ammonia 0.44%, protein 2.25%, fat 0.50%, carbohydrates 42.58%, crude fiber 43.50% and ash 2.65%.

There is not an economical process known by which all the sugar can be extracted from sugar cane. Every ton of bagasse produced contains a certain amount of sugar. This sugar exists in wet bagasse (as it leaves the sugar cane mill) that contains fifty per cent. (50%) of moisture. By reducing the moisture the sugar content is enhanced. This dried material contains: water 8.52%, cellulose or pith 47.98% and fiber 43.50%. After years of effort to perfect a process a practical, rapid means of economic drying was found. More than a year was devoted to a careful experiment to separate the cellulose or pith from the fiber, because every unit of fiber reduced in the cellulose or pith increases the feed-value of the cellulose or pith.

Having familiarized myself with the properties of bagasse through years of study in an effort to solve the feeding problem, I appreciate why failures have been made in many efforts attempted to exploit the fiber of sugar cane bagasse for manufactory. Bagasse as it leaves the last roller of the cane mill contains approximately fifty per cent. (50%) moisture. This excessive moisture combined with the saccharine causes fermentation, thus depreciating its commercial value unless the material is compressed, expelling the air, a process which has never been done before with bagasse. Until this moisture content is eliminated any effort to chemically treat must of necessity be so powerful (to effectively destroy foreign elements not necessary), that the tissues of the fiber have been destroyed. Perhaps the same mistake would have been made along the feed line had fiber been as valuable as a feed material as it was for press-board or other fabrication. But the requirements necessary to the use of the cellulose or pith of bagasse for feed demanded the separation of the fiber. And thus in the solution of this mechanical problem has been evolved an economic, practical, rapid, mechanical process for producing fiber and cellulose or pith from sugar cane bagasse.

The proper handling of this material requires its compression as it is produced at the sugar cane mill thus preserving it for drying: its handling when drying in such a manner as to insure: 1st, the evaporation of moisture. 2nd, its preparation through this stage to insure the separation of cellulose or pith from the fiber. 3rd: its further treatment through beating or rolling devices which prepare it for final agitation. 4th: the separation of the dried bagasse into cellulose or pith and fiber.

In practising the invention the bagasse is first compressed in any suitable manner. This expels the air from and preserves the bagasse against fermentation.

It is then combed to a state of fluffiness thereby better preparing the bagasse for drying. After leaving combing device it enters the drying process.

The drying reduces the moisture content of sugar cane bagasse to a point readily insuring the separation of cellulose or pith from fiber. Where steam or hot air is used in drying a super-heater can be used, preferably an independent device fired separately from the boiler, to insure perfect control of the temperature which in addition increases the efficiency and capacity of the drying device. To effect the rapid drying of the bagasse live, superheated and exhaust steam is used as a basis and air heated to a proper degree is employed. To further insure against loss in heat the live and super-heated steam is used independently and separately from the exhaust steam.

The bagasse is subjected to a second combing after it is partly dried to further prepare it for final drying and to increase the separation of cellulose or pith from the fiber proper.

Any separation of the cellulose or pith or light material from the bagasse which occurs where an inclosed drier is used is taken off preferably by an exhaust fan or any other suitable manner and the bagasse continuing through the drying operation.

After passing through one or more combing devices and from each comber passing through a drying apparatus, during which time there has occurred a certain separation as stated, the bagasse is conveyed through a macerator, first passing through an apparatus preferably of knives on a revolving mandrel to cut and reduce the size of the bagasse to insure a perfect separation in the macerating machine, which can be of any suitable design for the purpose and effect.

Sets of rollers operating at different speeds can be used instead of macerating machines.

The fiber and cellulose or pith is then in a dry state and is then separated in any suitable apparatus. The long strands of fiber are then ready to be baled and handled for commercial use. The cellulose and pith which is separated from the fiber is also in a dry state and can then be used for stock feed and for the manufacture of stock feed and other useful purposes.

What I claim and desire protected by Letters Patent:

1. The process of expunging air from bagasse to retard fermentation, combing the same to produce fluffiness, subjecting it to the action of heat to evaporate the moisture, after which it is cut, beaten or rubbed and screened.

2. The process of treating bagasse to prepare it for commercial purposes which consists in compressing it, combing it to a state of fluffiness, removing moisture therefrom, then repeating the operation of combing and further evaporating moisture and then cutting it in suitable sizes after which it is beaten or rubbed and screened and separating the fiber from the pith and cellulose.

In testimony whereof I have hereunto set my hand in the presence of two subscribing witnesses.

CHARLES H. O'ROURKE.

Witnesses:
CHARLES A. FARRELL,
SAUL H. C. CAROUSSINI.